Nov. 30, 1943.  T. J. MORGAN ET AL  2,335,436
CINEMATOGRAPH
Original Filed April 15, 1940
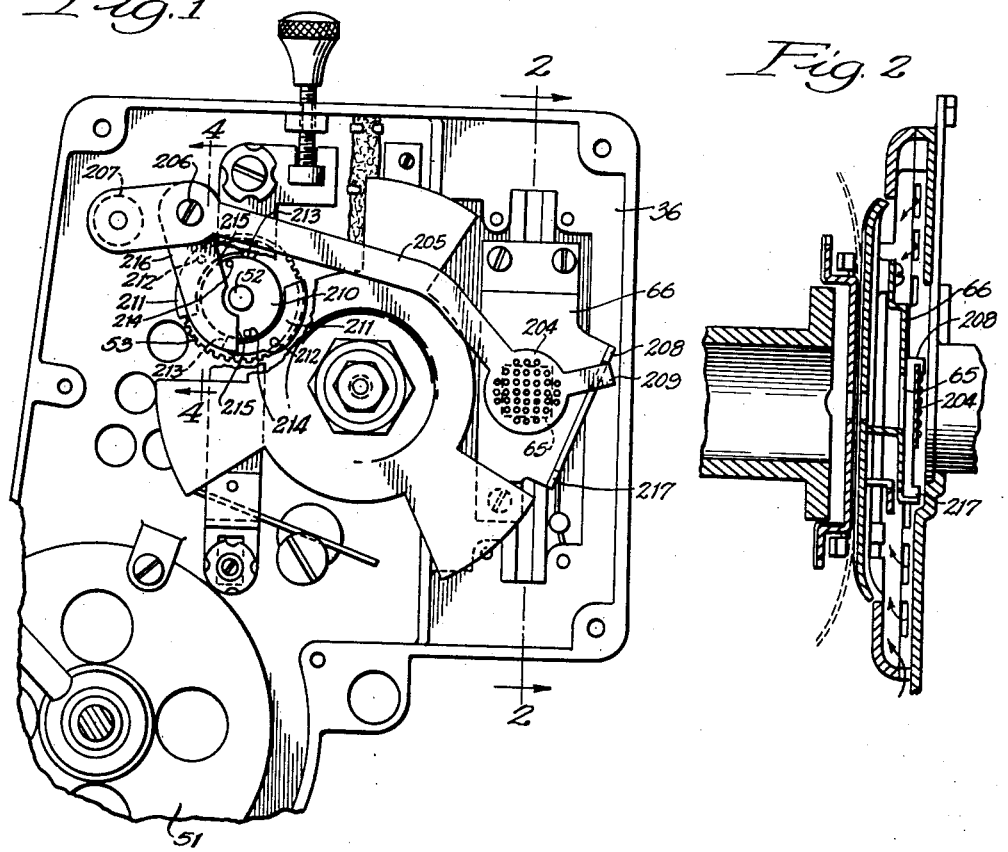
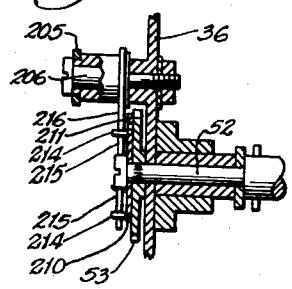
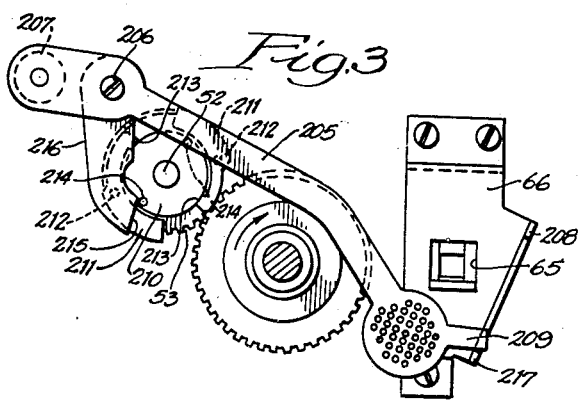
Inventors:
Thomas J. Morgan and
Arthur S. Dearborn,
By Soans, Pond & Anderson,
Attorneys.

Patented Nov. 30, 1943

2,335,436

UNITED STATES PATENT OFFICE 2,335,436

CINEMATOGRAPH

Thomas J. Morgan, Chicago, and Arthur S. Dearborn, Hinsdale, Ill., assignors to Ampro Corporation, a corporation of Illinois Original application April 15, 1940, Serial No. 329,784. Divided and this application July 21, 1941, Serial No. 403,368

3 Claims. (Cl. 88—19.4)

This application is a division of co-pending application Serial No. 329,784, filed April 15, 1940, which relates to cinematographs, and this application has particular reference to the construction of a so-called fire shutter in a cinematograph.

The main objects of the invention are to provide a fire shutter which will automatically be in operative position whenever the film feeding mechanism is inoperative, so as to thereby protect the film against burning by heat radiated from the source of light employed for projection purposes; to provide such a fire shutter which will be automatically moved to inoperative position when the film is fed at such a speed that the danger of burning is overcome; to provide a quietly and smoothly operating structure which will be wholly automatic and which will be efficient and durable.

Other objects and advantages will be understood by reference to the following specification and accompanying drawing wherein there is illustrated a fire shutter construction embodying a selected form of the invention.

In the drawing:

Fig. 1 is an elevation of the fire shutter mechanism as revealed upon removal from the cinematograph of certain housing portions:

Fig. 2 is a section on the line 2—2 of Fig. 1;

Fig. 3 is a fragmentary elevation corresponding to a portion of Fig. 1 but showing certain parts in changed positions; and Fig. 4 is a section approximately on the line 4—4 of Fig. 1.

Referring now to the drawing, there is illustrated at 36 a housing member from which other housing members have been removed to reveal the fire shutter structure and certain cooperating parts. The film feeding mechanism (not shown) may be of any suitable construction and it may be driven from an electric motor indicated at 51 which is suitably mounted in the housing structure including the part 36.

The motor 51 may be connected by suitable means such as a belt and pulleys to a shaft 52 so as to drive the latter and it should be understood that any suitable clutch arrangement may be employed in the driving connection between the motor and shaft 52, so that without shutting off the motor 51, the drive of the shaft 52 may be interrupted to thereby effect still picture projection. It will be understood that the film feeding mechanism and other operating parts are driven by suitable connections to the shaft 52.

The fire shutter is indicated at 204, the same being in the form of a sheet metal member bearing a multiplicity of perforations which permit sufficient light to pass therethrough for still picture projection. Said shutter 204 is carried at the free end of an arm 205 which is pivotally mounted near its other end as indicated at 206. The arm 205 is extended beyond its pivot 206 and provided with a weight 207 for counterbalancing the long arm 205 and shutter 204.

When the film feeding mechanism is stationary or when it is stopped for still picture projection, the shutter 204 is maintained in the position illustrated in Figure 1 wherein it overlies the projection opening 65 in the projection opening plate 66, the counterbalancing weight 207 serving to maintain the shutter in that position. Movement of the shutter by the counterbalancing weight past the projection opening 65 is prevented by a stop ear 208 formed on the plate 66 for engagement with a finger 209 which extends from the shutter.

When the mechanism is in normal operation and the film is being fed for moving picture projection, a centrifugal force responsive arrangement operates to lower the fire shutter to permit the full volume of light to pass through said projection opening 65.

The centrifugal force responsive means comprises a disc-like member 210 rotatably mounted on the driven shaft 52 adjacent the face of a gear 53 which is secured to the shaft 52 and which meshes with another gear for driving certain parts of the mechanism with which this application is not concerned. The disc 210 is smaller in diameter than the gear 53, so as to leave exposed a marginal portion on which a pair of clutch pawls 211 are pivotally mounted as indicated at 212. As shown, the clutch pawls are located in diametrically opposed positions on the face of the gear 53 and the disc 210.

The clutch members 211 are provided with clutch shoe portions 213 for engaging the periphery of the disc 210. The clutch shoe portions 213 are formed at one end of the clutch members 211 and on the opposite sides of the respective pivots 212 said clutch members are of increased size and weight.

It will be seen that as an incident to rotation of the gear 53, the weighted ends of the clutch members 211 will be thrown outwardly, thereby causing the shoe portions 213 to frictionally engage the periphery of the disc 210. Such frictional engagement is sufficient, when the speed of rotation of the shaft 52 is high enough for moving picture projection purposes, to cause the disc 210 to rotate with the gear and thereby to cause either one of a pair of pins 214 which extend laterally from the disc 210 to engage the respectively adjacent edge portions such as 215 of an arm 216.

The arm 216 is rigidly connected to the fire shutter arm 205 so that any rocking movement imparted to said arm by the pins 214 will cause the fire shutter to move downwardly to clear the projection opening 65. It may be observed that the fire shutter is thus moved downwardly in either direction of rotation of the gear 53, and that this is of importance particularly in cinematographs which are arranged so that the film may be projected when fed either forwardly or rearwardly. Downward movement of the fire shutter may be limited by engagement of its finger 209 with a stop 217 formed on said plate 66.

It will be understood that the frictional driving engagement between the pawls 211 and the disc 210 need not be very great inasmuch as the force required to move the shutter downwardly is only a relatively light force, i. e., sufficient to overcome the counterbalancing effect of the weight 207. When the fire shutter is lowered to its lower limit of movement, the disc 210 will be held against rotary movement and the driving pawls 211 will slide around the periphery of said disc. The frictional resistance to rotation of the gear 53 and the shaft 52 thus created is a negligible factor in respect of the normal operation of the device.

It will be observed that the described structure involves only a few relatively small and simple parts none of which requires any expensive material or constructional operations. Hence the described fire shutter mechanism may be produced economically and at low cost. It may also be noted that the described structure embodies no noise producing movements and that it operates quietly while at the same time being wholly automatic so that the film is at all times protected against burning without special attention by the machine operator.

Various changes in the described construction may be made without departing from the spirit of the invention, the scope of which should be determined by reference to the following claims.

We claim:

1. In a cinematograph, a fire shutter pivotally mounted for movement into and out of operative position and normally disposed in operative position, a rotatably driven member which is selectively driven in opposite directions, a movable element associated with said rotatably driven member, centrifugal force responsive means carried by said member for frictionally drivingly engaging said element to effect movement thereof incident to rotation of said driven member, and cooperating means carried by said element and said fire shutter and operative upon rotation of said movable element in either direction, to effect movement of the fire shutter to the same inoperative position.

2. In a cinematograph, a fire shutter having an arm portion, said shutter being pivotally mounted for movement into and out of operative position and normally disposed in operative position, means for limiting the movement of said shutter to position the same in predetermined operative and inoperative positions, a rotatable member adapted to be selectively driven in either direction, a movable element associated with said driven member, centrifugal force responsive means carried by said member for frictionally drivingly engaging said element to effect movement of the latter incident to rotation of said driven member, and a pair of relatively spaced pins carried by said element and adapted, when the latter is moved, to engage an adjacent portion of said arm to move the shutter to inoperative position as an incident to movement of said element in either direction.

3. In a cinematograph, a fire shutter having an elongated arm pivotally mounted adjacent one end so as to support said shutter for rocking movement into and out of operative position, said shutter being normally disposed in operative position, a leg extending laterally from the pivotally mounted end portion of said arm, a rotatable member adapted to be selectively driven in either direction, a movable element associated with said driven member, centrifugal force responsive means carried by said driven member for frictionally drivingly engaging said element to effect movement thereof incident to rotation of said driven member in either direction, and a pair of pins projecting from said element and respectively adapted, when the latter is moved in opposite directions, to engage adjacent portions of said leg to thereby effect movement of the shutter from operative to inoperative position as an incident to rotation of said driven member in either direction.

THOMAS J. MORGAN.
ARTHUR S. DEARBORN.